(12) United States Patent
Hodge

(10) Patent No.: US 10,280,651 B1
(45) Date of Patent: May 7, 2019

(54) PADLOCK AND CHAIN CONNECTING APPARATUS AND SECURE PADLOCK AND CHAIN ASSEMBLY

(71) Applicant: Hodge Products, Inc., Santee, CA (US)

(72) Inventor: Anthony A. Hodge, Santee, CA (US)

(73) Assignee: Hodge Products, Inc., San Diego, CA (US)

( * ) Notice: Subject to any disclaimer, the term of this patent is extended or adjusted under 35 U.S.C. 154(b) by 0 days.

(21) Appl. No.: 15/901,650

(22) Filed: Feb. 21, 2018

(51) Int. Cl.
*E05B 67/38* (2006.01)
*F16B 9/02* (2006.01)

(52) U.S. Cl.
CPC .............. *E05B 67/383* (2013.01); *F16B 9/02* (2013.01); *E05B 2067/386* (2013.01)

(58) Field of Classification Search
CPC .......... Y10T 24/3485; Y10T 24/45293; E05B 67/383; E05B 2067/386; F16B 9/02
USPC ......................... 70/14, 18, 19, 51, 53–56, 58
See application file for complete search history.

(56) References Cited

U.S. PATENT DOCUMENTS

| | | | | |
|---|---|---|---|---|
| 899,268 A * | 9/1908 | Soley | | |
| 1,550,454 A * | 8/1925 | Provost | ................... | B60C 27/08 24/598.5 |
| 1,845,354 A * | 2/1932 | Soref | ..................... | E05B 67/003 70/15 |
| 1,875,400 A * | 9/1932 | Wood | ...................... | F16G 15/04 24/598.5 |
| 2,166,860 A * | 7/1939 | Davis | ..................... | B65D 29/00 70/53 |
| 3,210,142 A * | 10/1965 | Dewart | ................ | A47B 81/007 16/86 R |
| 3,590,608 A * | 7/1971 | Smyth | ................... | A63C 11/006 280/814 |
| 3,599,298 A * | 8/1971 | Anderson | ............ | A44C 5/2033 24/598.5 |
| 4,085,599 A * | 4/1978 | Fischer | ................. | E05B 67/383 70/14 |
| 4,218,902 A * | 8/1980 | Druschel | ............... | E05B 17/002 70/55 |
| 4,226,100 A * | 10/1980 | Hampton | .............. | E05B 17/002 70/51 |
| 4,286,445 A * | 9/1981 | Sills | ....................... | E05B 17/002 70/455 |
| 4,694,667 A * | 9/1987 | Hodge | .................. | E05B 67/383 24/116 R |

(Continued)

*Primary Examiner* — Lloyd A Gall
(74) *Attorney, Agent, or Firm* — Procopio Cory Hargreaves and Savitch LLP (57) ABSTRACT

A padlock and chain connecting apparatus has a pair of identical elongate plates of uniform width, each with a first portion extending from a first end, a second portion extending from a second end, and a step between the first and second portions. Each plate has first opening adjacent the first end for engagement over a padlock shackle and a second opening adjacent the second end for receiving a permanent fastener. The second portion has an inclined notch extending inwardly from a first side. In the secured condition, the second portions of the plates are in face to face engagement with the first portions spaced apart and the aligned first openings engaged over a padlock shackle, the notches overlapped to define a securing orifice through which a link of a chain is trapped, and a permanent fastener secured through the aligned second openings to secure the plates together.

13 Claims, 10 Drawing Sheets

(56) References Cited

U.S. PATENT DOCUMENTS

| | | | | |
|---|---|---|---|---|
| 5,333,476 | A * | 8/1994 | Byrd, Jr. | E05B 67/063 70/227 |
| 5,582,042 | A * | 12/1996 | Mordick | E05B 67/383 70/14 |
| 5,761,935 | A * | 6/1998 | Adelmeyer | E05B 17/002 70/455 |
| 5,907,962 | A * | 6/1999 | Smithson | E05B 67/383 70/14 |
| 5,956,980 | A * | 9/1999 | Jenkins, Jr. | E05B 73/0005 24/598.5 |
| 6,257,032 | B1 * | 7/2001 | Cecil | B62D 43/007 70/259 |
| 6,546,763 | B1 * | 4/2003 | Pielach | E05B 65/0014 292/315 |
| 6,813,914 | B2 * | 11/2004 | Chen | E05B 17/002 70/423 |
| 6,997,420 | B2 * | 2/2006 | Yudis | F16L 35/00 248/89 |
| 7,131,300 | B1 * | 11/2006 | Monasco | E05B 13/001 70/55 |
| 7,503,194 | B2 * | 3/2009 | McNeil | E05B 67/383 248/552 |
| 2002/0056295 | A1 * | 5/2002 | Huang | E05B 73/0082 70/58 |

* cited by examiner

PADLOCK AND CHAIN CONNECTING APPARATUS AND SECURE PADLOCK AND CHAIN ASSEMBLY

BACKGROUND

Related Field

The subject matter discussed herein relates generally to chain and padlock sets and is particularly concerned with a securing device or connecting apparatus for securely fastening a chain to a padlock without welding, to provide a secure padlock and chain assembly.

Related Background

U.S. Pat. No. 4,694,667 of Hodge describes a prior connecting link or securing apparatus for avoiding separation of a padlock and chain which are used together. The apparatus comprises a pair of brackets each having an upstanding ear and an outwardly extending arm, the arms having opposite notches and being secured together with the notches overlapping to receive a link of a chain. Aligned openings in the upstanding arms extend over a padlock shackle. A special one-way screw holds the brackets together and is located between the ears to prevent use of pliers or the like to loosen the screw, and is a specialized self-tapping locking screw or else has a ramp type geometry which provides no engagement for a screwdriver if an effort is made to loosen the screw after installation. One problem with this arrangement was the one way screw design which did not always work well.

Another connecting link or padlock and chain securing apparatus sold by Hodge Products Inc. under the name Sav Lok includes triangular shape brackets or plates with no upstanding ears, with the plates secured together by rivets at two corners of the triangle.

SUMMARY

In some embodiments, a padlock and chain connecting apparatus or assembly comprises a pair of identical elongate plates of uniform width along their length having first and second ends and opposite first and second sides, a first portion extending from the first end towards the second end, a second portion extending from the second end towards the first end, a step portion between the first and second portions which offsets the first portion from the second portion, the step portion being located closer to the first end than the second end, the first portion having a first opening adjacent the first end for engagement over a padlock shackle and the second portion having a second opening adjacent the second end for receiving a fastener, the second portion of each plate having a notch extending inwardly from the first side and inclined relative to the opposite sides of the plate, whereby when the second portions of the plates are placed in face to face engagement with the first portions spaced apart and in alignment, the notches overlap to define a securing orifice for trapping a link of a chain, and a permanent fastener configured to extend through the aligned second openings to secure the plates together when a link of a chain is engaged in the securing orifice and the first openings are engaged over a padlock shackle.

A series of pairs of matching plates may be provided with first openings of different sizes for fitting over different size padlock shackle diameters, such as ¼ inch, ³⁄₁₆ inches, ⁹⁄₃₂ inches, ⁵⁄₁₆ inches, ⅜ inches, ⁷⁄₁₆ inches, and ½ inch, with the plates all being of identical dimensions apart from the diameter of the first openings.

In some embodiments, each notch is inclined away from the step portion and first end portion and towards the second end of the respective plate. In some embodiments, a third opening for receiving a fastener is located in the second portion of the plate between the notch and the step portion. Permanent fasteners such as rivets or the like may be engaged through the respective aligned second openings and third openings to secure the plates together.

Other features and advantages of the present invention will become more readily apparent to those of ordinary skill in the art after reviewing the following detailed description and accompanying drawings.

DETAILED DESCRIPTION

The subject matter described herein is taught by way of example implementations. Various details have been omitted for the sake of clarity and to avoid obscuring the subject matter. The examples shown below are directed to a connecting link or bracket apparatus designed to secure a chain to a padlock and which comprises two identical plates or brackets designed for engaging face to face and securing together at one end with a single fastener or rivet, and having opposite ends which are offset from the remainder of the respective bracket and designed to engage over the shackle of a padlock. The brackets have slots which engage to form an opening or secure orifice in which a link of a chain may be secured before the brackets are connected together at one end. Other features and advantages of the subject matter should be apparent from the following description.

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation.

Figure 1:
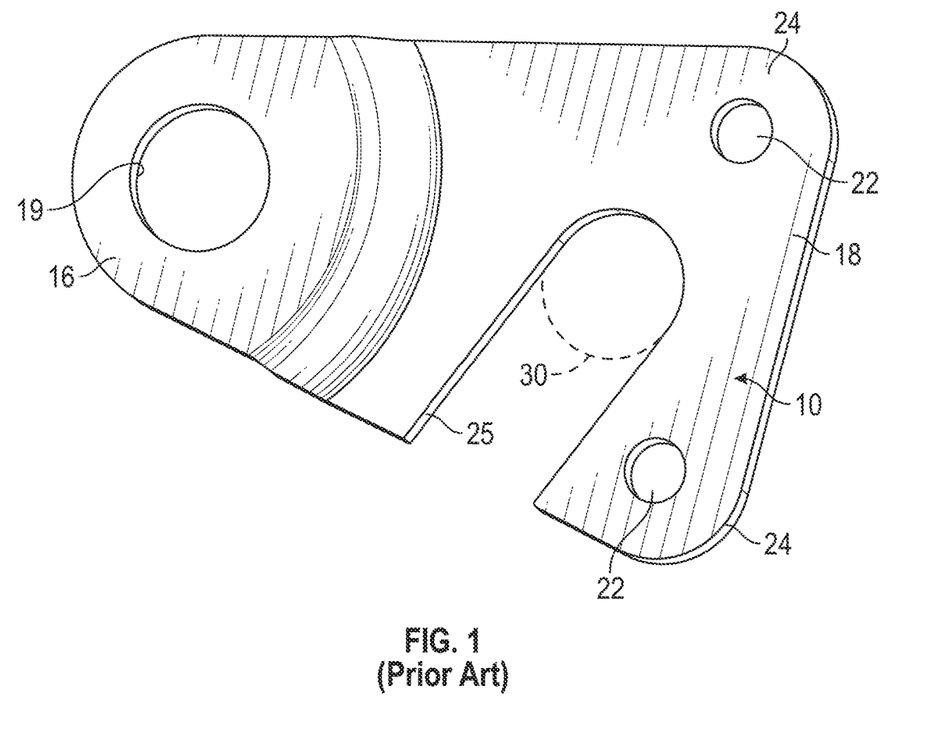
FIG. 1 is a top plan view of a prior art connecting link or bracket apparatus or assembly.
Figure 2:
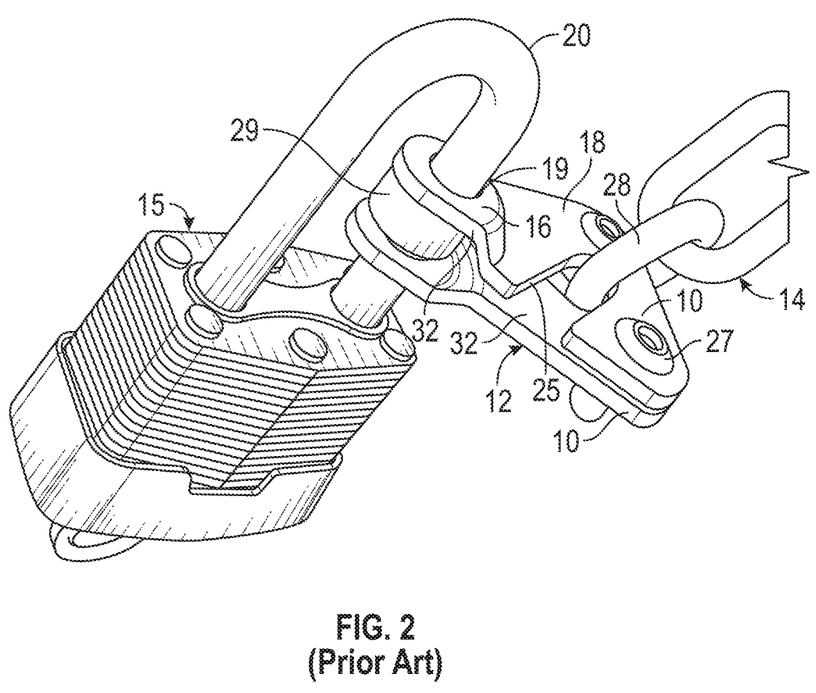
FIG. 2 is a perspective view of the prior art connecting link apparatus of FIG. 1 holding a padlock and chain together to form a secure padlock and chain assembly without welding.

FIG. 1 illustrates one of two identical triangular shape plates or brackets 10 of a prior art connecting link or bracket apparatus or assembly 12 which is illustrated in an assembled condition in FIG. 2, securing a chain 14 to a padlock 15 in a secured or permanent padlock and chain assembly. An upstanding ear portion 16 is formed at one vertex of the triangle and is raised relative to the remainder 18 of the plate or bracket. Ear portion 16 has a circular hole 19 designed for engagement over a straight portion of the U-shaped shackle 20 (FIG. 2) of a padlock 15. Holes 22 are provided at the other two vertices 24 of the plate. An angled slot 25 extends from one side edge of the plate towards the opposite vertex 24 and hole 22. The two identical triangular plates 10 are secured face to face by rivets 27 extending through aligned holes 22, as illustrated in FIG. 2, capturing a link 28 of chain 14 in an overlapping portion 30 of the two slots 25 (shown in dotted outline in FIG. 1). In order to assemble the connecting link 12 as in FIG. 2, a first plate is engaged over padlock shackle 20, and a link 28 of chain 14 is engaged in the end of slot 25 of that plate. The hole 19 of the second plate is then engaged over the shackle with the recessed, inner faces 32 of the plates facing one another and a spacer 29 engaging over the shackle between the two rings, as shown in FIG. 2. Once the plates are assembled in the secure assembly of FIG. 2, the holes cannot pass over the curved part of the free end of the shackle if the padlock is unlocked. Thus, the chain is permanently secured to the padlock and cannot be separated even when the padlock shackle is open.

Figure 3:
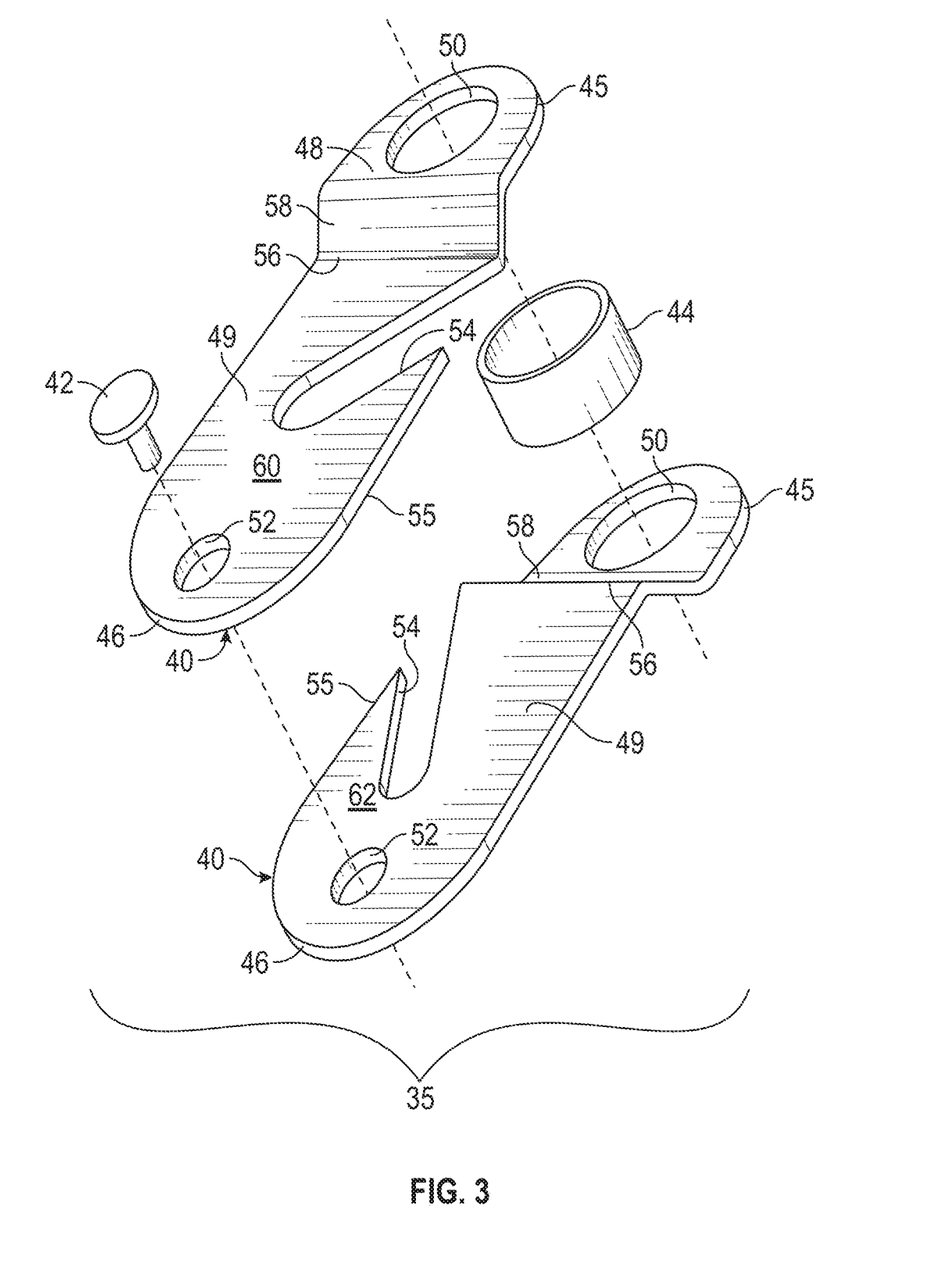
FIG. 3 is a perspective view of one embodiment of the separated parts of one embodiment of a connecting link or bracket apparatus for securing a chain to a padlock.
Figure 4:
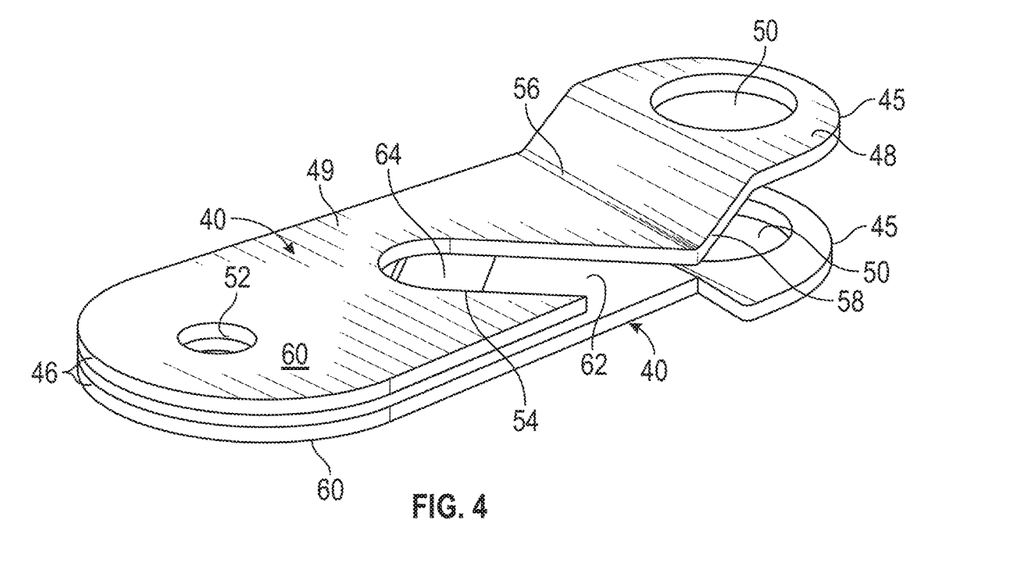
FIG. 4 is perspective view of the assembled connecting link of FIG. 3.
Figure 5:
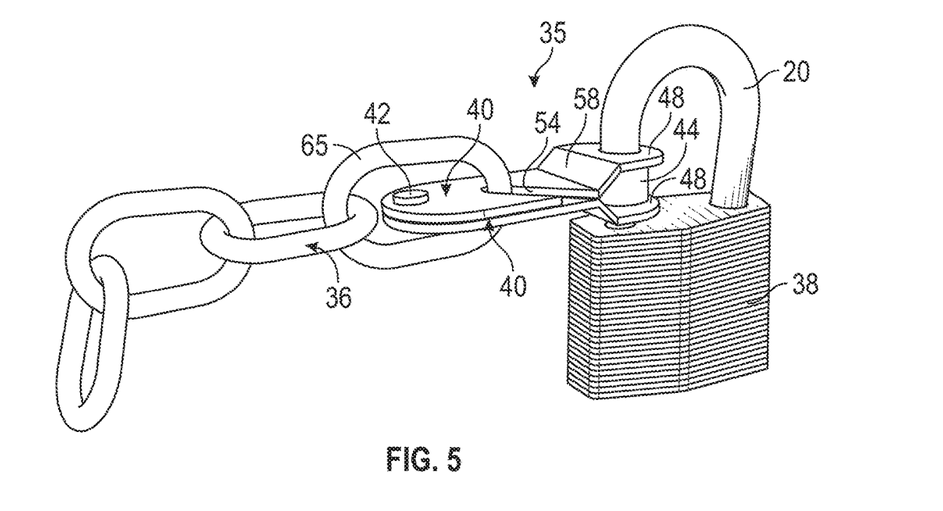
FIG. 5 is a perspective view of one embodiment of a secure padlock and chain assembly with the connecting link apparatus of FIGS. 3 and 4 securing a chain to a padlock.

FIGS. 3 to 6B illustrate one embodiment of an improved connecting link or bracket apparatus or assembly 35 for securing a chain such as chain 36 of FIG. 5 to padlock 38. Apparatus 35 basically comprises a pair of identical plates or brackets 40 of high strength alloy steel or the like each having a first portion 48, a second portion 49, and a step portion 58 between the first and second portions 48, 49, a peen or pop rivet or other permanent mechanical fastener 42 similar to rivets 27 of the prior art assembly 10 of FIGS. 1 and 2, and a spacer 44 similar to spacer 29 of the prior art assembly 10. Each plate or bracket 40 is of uniform width along its length, with opposite rounded ends 45, 46. The first portion 48 which extends from end 45 is offset or upstanding relative to the second portion 49 via the inclined shoulder or step portion 58, so that portions 48 and 49 lie in parallel planes. A first hole 50 is located at the first end 45 of the plate and a second, smaller hole 52 is located close to the second end 46. An angled slot 54 extends from one side edge 55 of each plate 40, starting at or close to the junction 56 between inclined step portion 58 and the remainder of the plate. Slot 54 is inclined away from first portion 48 and towards the second end. In FIG. 3, the outer surface 60 of one of the plates and the inner surface 62 of the other plate are shown facing upwards, with the openings aligned. The plates are oriented with inner surfaces 62 facing one another prior to assembly, and then moved into face to face engagement as in FIG. 4. The plates are riveted together in the assembled condition of FIG. 5.

When the two plates 40 are aligned with their inner faces 62 facing one another, as in FIG. 4, the two slots 54 extend in opposite directions to leave an opening or securing orifice 64 where the slots overlap one another. It is this opening which is used to capture a link 65 of chain 36 in the assembled, secured condition of FIG. 5. In order to secure the padlock 38 to the chain 36 to provide secure padlock and chain assembly of FIG. 5, opening 50 of a first one of the plates 40 (the lowermost plate in the secured condition of FIG. 5) is engaged over shackle 20 when in the open position, and moved over the curved part of the shackle onto the straight part until it is next to the permanently secured shackle end, followed by the optional spacer ring 44 and the opening 50 of the second one of the plates 40. Prior to engaging the uppermost plate 40, link 65 is first engaged in the end of the notch 54 in the lowermost plate 40. Opening 50 of the second or uppermost one of the plates is then engaged over the open shackle or pivot post 20 of the padlock and moved over the arcuate or curved portion of the shackle while rotated into a position out of alignment with lowermost plate 40, so that the open end of notch 54 can engage over the link 65. The uppermost plate is then rotated back into alignment with the lower most plate while the link 65 slides to the end of uppermost notch 54. At this point, plates 40 are permanently secured together by pop rivet 42 extending through openings 52, trapping link 65 in orifice 64. The assembled connecting device 35 as illustrated in FIG. 5 can then no longer be removed from shackle 20 since openings 50 and link 65 are unable to slide over the curved portion of the padlock shackle. The padlock shackle may then be engaged with another item to be locked to the chain or with the opposite end of the chain 36, before locking the free end of shackle 20 in the padlock body.

Figure 6A:
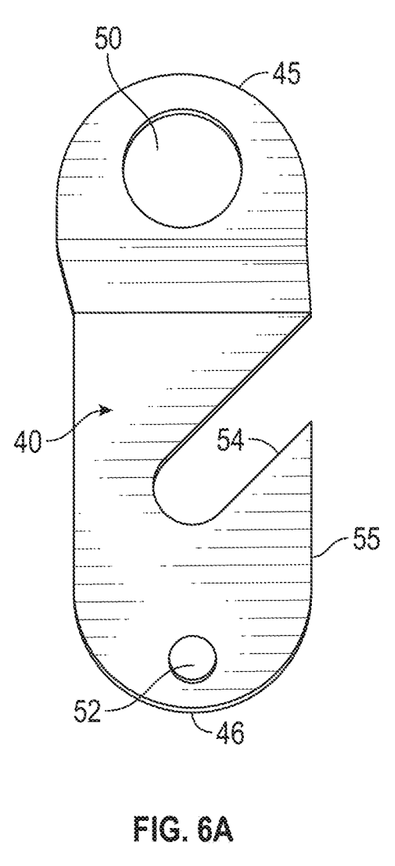
FIG. 6A is a top plan view of one of the connecting links or brackets which forms one half of the connecting link apparatus of FIGS. 3 to 5.
Figure 6B:
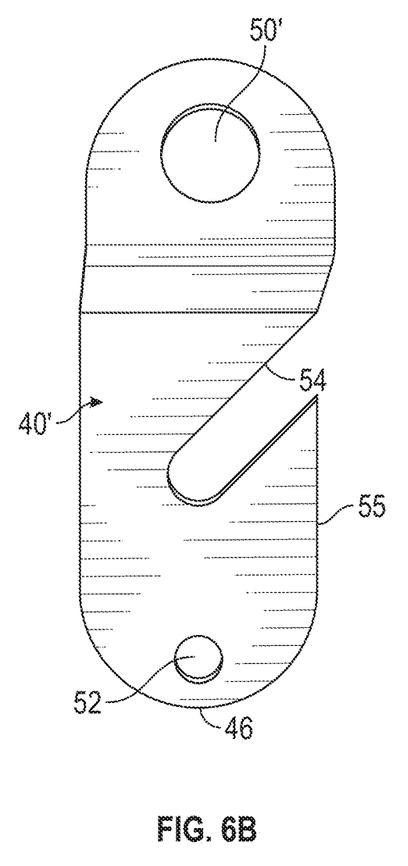
FIG. 6B is a top plan view of a connecting link or bracket similar to FIG. 6A but with a different size hole at one end for engaging a padlock shackle of different dimensions.

FIGS. 6A and 6B illustrate plates 40 and 40' which are identical in size and shape apart from the shackle openings 50 and 50', with opening 50 having a diameter to fit the largest ½ inch shackle diameter and chain thicknesses and opening 50' for fitting a smaller shackle diameter and chain thickness, e.g. 9/32 inch, without being able to slide over the curved portion of the shackle when two identical plates are secured together to retain a link of a chain as in FIG. 4. In some embodiments, plates with openings 40 of five different diameters are provided. Thus, the entire range of five (or more) shackle diameters can be accommodated in plates of the same length and width. This overcomes a problem with the prior art triangle version, which had to have two die sets to make two different size triangular plates to accommodate the entire range of shackle diameters, and also used two peen or pop rivets, making the assembly more expensive and complex to manufacture. Also, the size of the triangular plates to accommodate the larger shackle diameters and chain thicknesses was sometimes found to be too bulky for convenient installation and also resulted in bulky packages, taking up much more space when stacked one on top of the other on a pegboard in a store or the like.

FIGS. 7 to 11 illustrate a modified padlock and chain connecting device or link apparatus 70 according to another embodiment. Link apparatus 70 is similar in some respects to the apparatus 35 of the previous embodiment, and like reference numbers are used for like parts as appropriate. Apparatus 70 basically comprises a pair of identical plates or brackets 72 of high strength alloy steel or the like each having a first portion 74, a second portion 75, and an angled step portion 76 between the first and second portions 74, 75, at least one peen or pop rivet or other permanent mechanical fastener 42, and a spacer 44. In some embodiments, the angle of step portion 76 relative to the second portion 75 of the plate is around 45 degrees. Each plate or bracket 72 is of uniform width along its length, with opposite, rounded first and second ends 45, 46. The first portion 74 at first end 45 is offset or upstanding relative to the second portion 75 via the inclined shoulder or step portion 76, so that portions 74 and 75 lie in parallel planes. In some embodiments, portion 74 is shorter than portion 75. A first hole 50 is located in portion 74 adjacent the first end 45 of the plate and a second, smaller hole or rivet hole 52 is located in the second portion 75 close to the second end 46.

Figure 7:
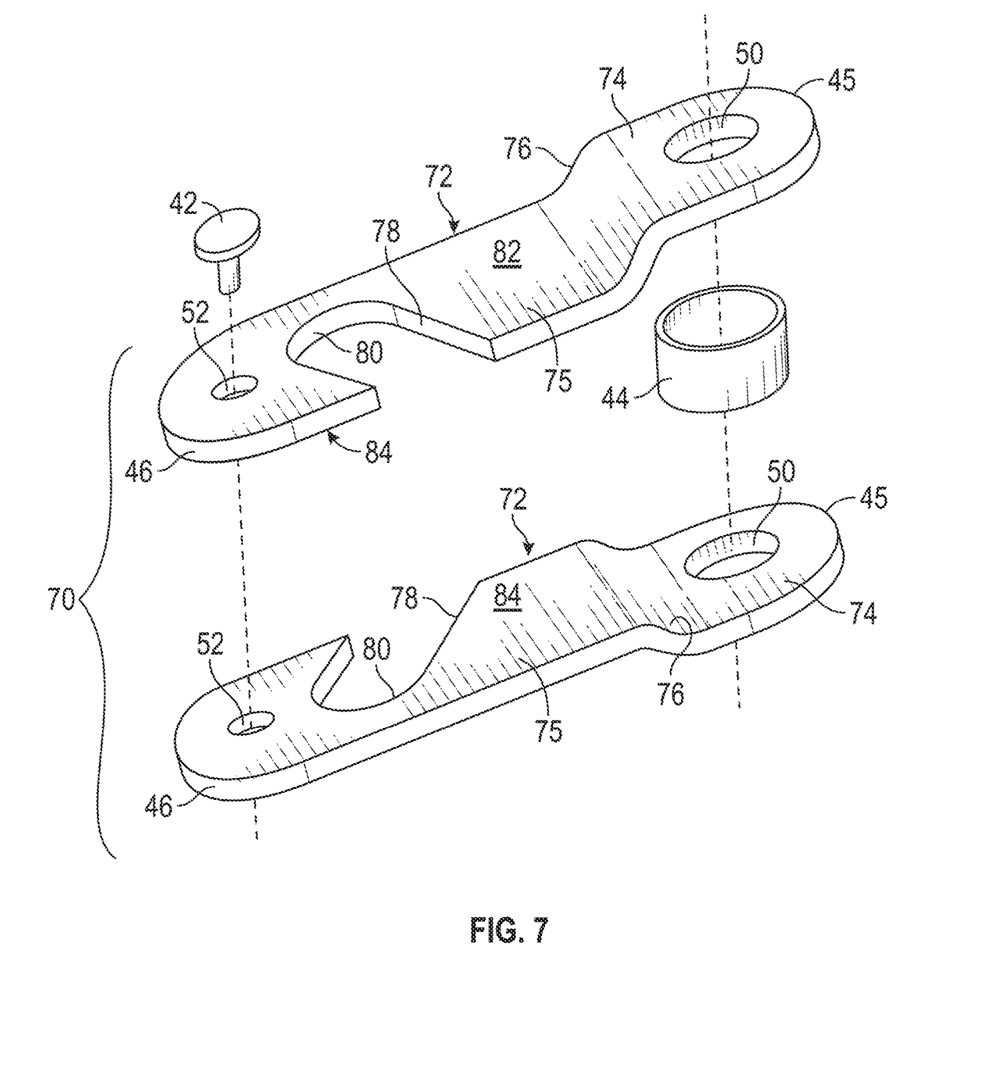
FIG. 7 is a perspective view of the separated parts of a second embodiment of a connecting link apparatus or device for securing a chain to a padlock.

The main difference between this embodiment and the previous embodiment is the position of the overlapping angled slots, which in this apparatus are located closer to the second end of each plate. An angled slot or notch 78 extends from one side edge 55 of each plate 72 and is inclined away from first end 74 and towards the second end of portion 75, with an inner end 80 close to rivet hole 52. Each notch extends across more than half the width of the respective plate. In FIG. 7, the outer surface 82 of one of the plates and the inner surface 84 of the other plate are shown facing upwards, with the openings 50 aligned. In some embodiments, each slot 78 may be at an angle a of the order of around 70 degrees to the side edge of the plate from which it extends (see FIG. 8). The plates are oriented with inner surfaces 84 facing one another prior to assembly, as in FIG. 7, then moved into face to face engagement as in FIG. 9. The plates may be riveted together in the assembled condition of FIG. 9 after installation over a padlock shackle, as described below.

Figure 8:
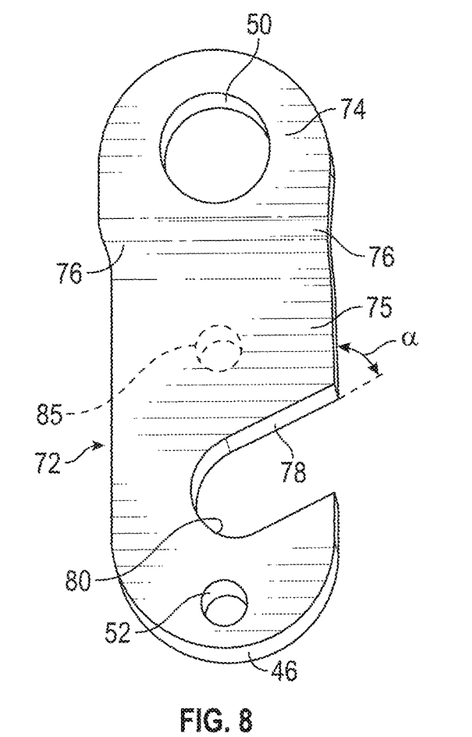
FIG. 8 is a top plan view of one of the elongate plates or links of the apparatus of FIG. 7.

As illustrated in dotted outline in FIG. 8, each plate 72 may have a second rivet hole 85 between slot 78 and inclined portion 76, so that the plates may be riveted together in two spaced locations if needed. For example, two spaced rivet holes 52, 85 may be provided in larger size plates to accommodate the largest sizes of padlock shackles. In this alternative, plates 72 may be secured together by a peen rivet through aligned holes 52 and a pop rivet through aligned holes 85. Alternatively, holes 85 may be unused, with a single peen rivet secured through holes 52, or a single pop rivet may be secured through aligned holes 85, and holes 52 may be unused. A peen rivet is used for holes 52 since it has a lower profile.

Figure 9:
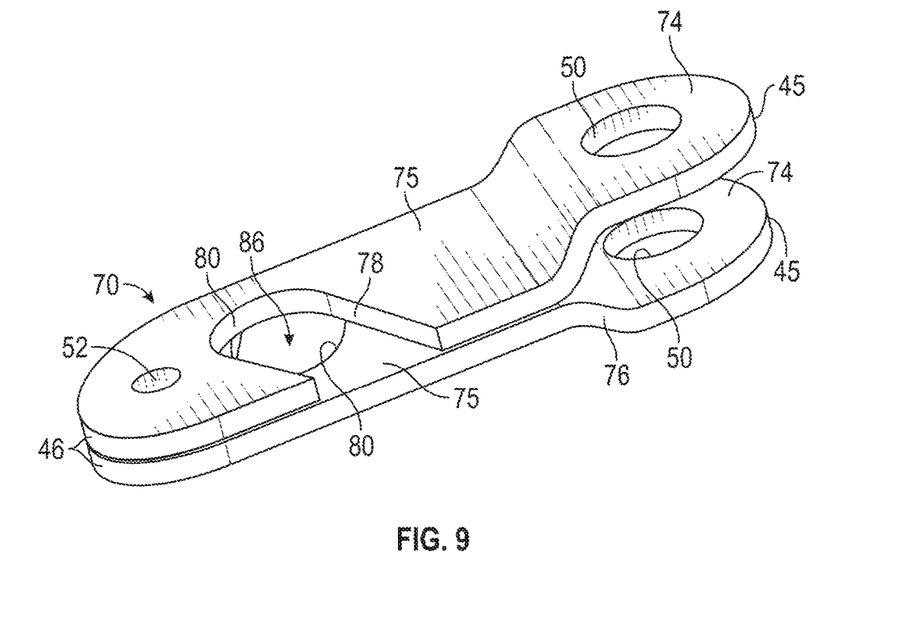
FIG. 9 is a perspective view of the assembled connecting link apparatus of FIG. 7.
Figure 10:
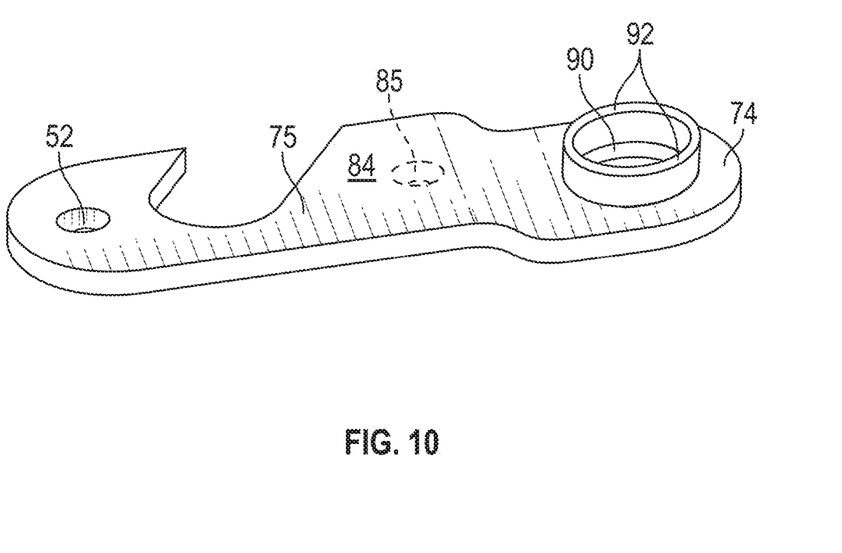
FIG. 10 is a perspective view of one of the connecting plates of FIG. 7 illustrating an optional rim or flange around the periphery of the padlock shackle engaging hole which replaces the separate spacer in one embodiment.

In the embodiment of FIGS. 7 to 9, a separate spacer 44 is part of the assembly to prevent separation of the connecting link from the padlock shackle, as in the previous embodiment. FIG. 10 illustrates a modified embodiment to avoid the need for separate spacer, in which each plate 72 has a modified shackle opening 90 with a raised circular rim or flange 92 extending outward from opening 90 on the inner face or surface of 84 of each plate. Excess material from punching out the hole or opening 90 may be used to create circular raised rim or flange 92.

When the two plates 75 are aligned with their inner faces 84 facing one another and in face to face engagement, as in FIG. 9, the two slots 78 extend in opposite directions to leave an opening or securing orifice 86 where the slots overlap one another. It is this opening which is used to capture a link 65 of chain 36 in the assembled, secured condition of FIG. 11, as described in more detail below.

Figure 11:
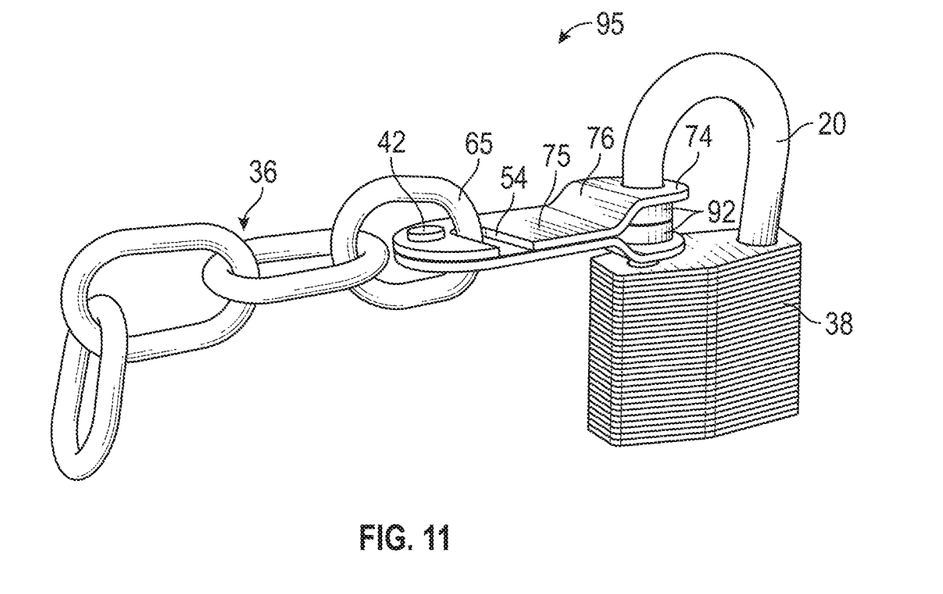
FIG. 11 is a perspective view similar to FIG. 5 of a secure padlock and chain assembly with the connecting link apparatus of FIGS. 7 to 10 securing a chain to a padlock.

In order to secure the padlock 38 to the chain 36 to provide the secure padlock and chain assembly 95 of FIG. 11, opening 50 or 90 of a first one of the plates 75 (e.g. the lowermost plate in the secured condition of FIG. 9) is engaged over padlock shackle 20 when the shackle is in the open position, and moved over the curved part of the shackle onto the straight part until it is next to the permanently secured shackle end. If the plate has no raised lips or flanges (e.g. as in FIG. 7 and 9), this is followed by the optional spacer ring 44, as described above in connection with FIG. 5 of the first embodiment. If the plate has a raised rim 92 around opening 90, the opening in the second or uppermost one of the plates 75 is engaged over the free end of the padlock shackle and moved over the shackle until the rim or flange 92 of opening 90 in the second plate engages the rim or flange 92 of the first or lowermost plate 75, as illustrated in FIG. 11. If there is no raised flange or rim 92 (see FIG. 7), the uppermost plate is moved over the shackle until it reaches the upper end of spacer ring 44, as in the previous embodiment.

Prior to engaging the uppermost plate 75, link 65 of chain 36 is first engaged in the end of the slot 54 in the lowermost plate 75. Opening 50 or 90 of the second or uppermost one of the plates is then engaged over the open shackle or pivot post 20 of the padlock and moved over the arcuate or curved portion of the shackle while rotated into a position out of alignment or swiveled outwards with respect to lowermost plate, so that the open end of notch 78 can engage over the link 65. The uppermost plate is then rotated back into alignment with the lowermost plate until the end 80 of uppermost notch 74 is moved into engagement with link 65, capturing the link between the opposing inner ends 80 of the two notches 78. Plates 75 are permanently secured together by securing pop rivet 42 through aligned openings or rivet holes 52, trapping link 65 in orifice 86. At this point the assembled connecting device 70 can no longer be removed from shackle 20 even if the shackle end is open, since the length of openings 90 and engaged flanges 92 prevents movement of these parts over the curved portion of the padlock shackle. Thus, a secure padlock and chain assembly 95 is provided which is more compact than the prior art assembly of FIG. 2, where the footprint of the large triangular plates 18 is much larger. If the plates each have a second rivet hole 85, a second rivet is secured through holes 85 to increase the securing force between the two plates, if necessary. The padlock shackle may then be opened and engaged with another item to be locked to the chain or with the opposite end of the chain 36, for example as illustrated in FIGS. 12 to 14, before locking the free end of shackle 20 in the padlock body.

Typically, a secure padlock and chain assembly such as the prior art assembly of FIG. 2, is packaged in a blister pack or the like and a plurality of such devices may be displayed for purchase on a peg board. The large size of the triangular plates can significantly limit the number of products which can be displayed on a pegboard (e.g. packages of assemblies with different size padlocks). The more compact packaging which may be used for assembly 35 of FIG. 5 or 95 of FIG. 11 allows for easier storage and transportation of the packaged padlock and chain assemblies, as well as easier stacking of such assemblies on a peg board in a store display or the like. The padlock and chain assembly may be used in various applications to secure an object to a padlock. For example, the chain may be engaged through a wheel of a bicycle or through openings in other objects to be secured, and the chain may then be extended about a fixed member such as a post, fence, lock member or the like. The free end of the chain can then be secured to the padlock shackle 20 before locking the shackle closed. In other embodiments, the free end of chain 36 may be secured to another item.

Figure 12:
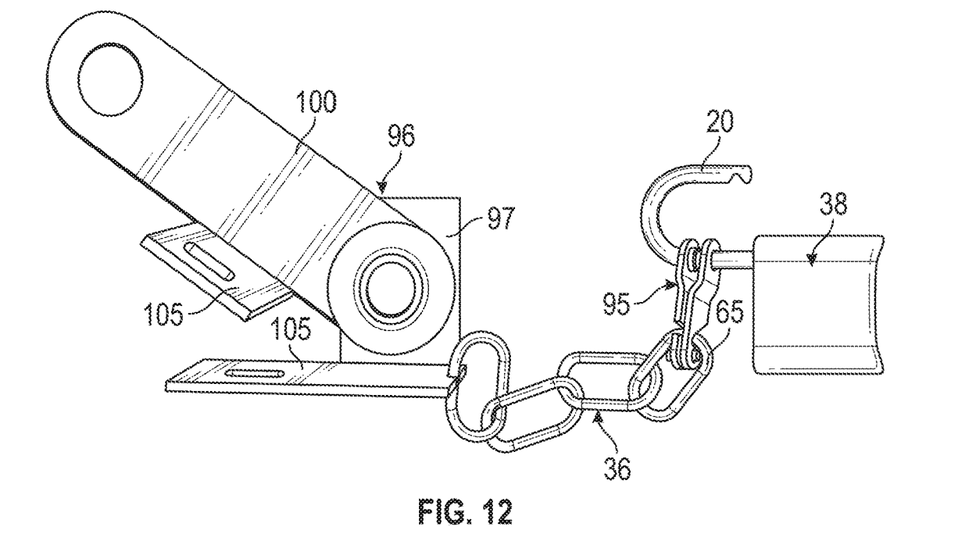
FIG. 12 is a perspective view illustrating the chain of FIG. 11 secured to a trash container lid locking apparatus.
Figure 13:
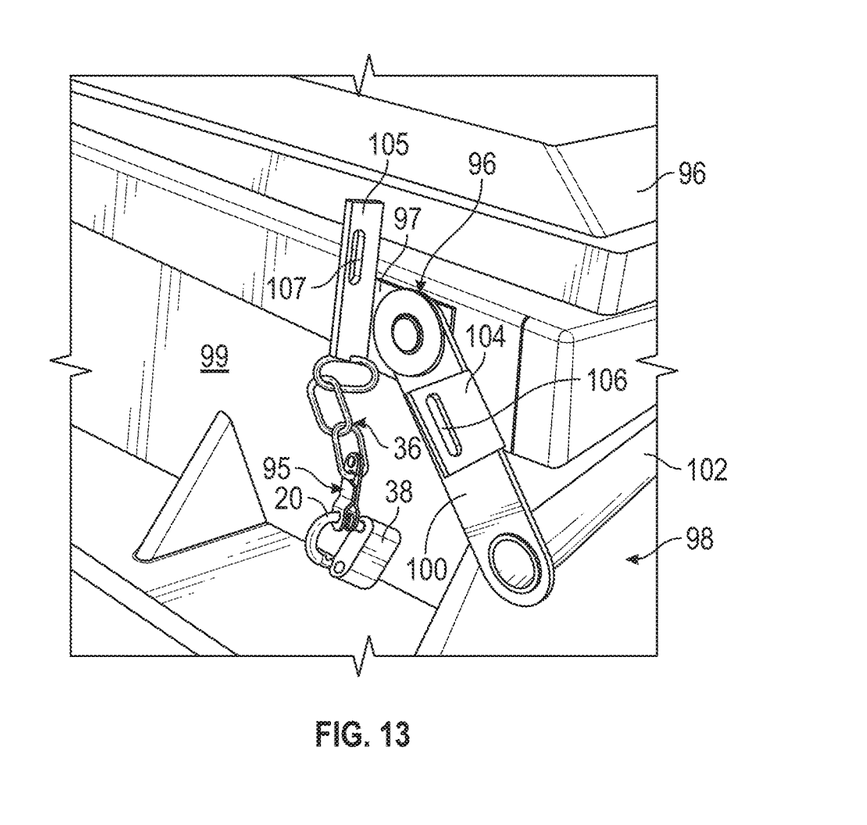
FIG. 13 illustrates the apparatus of FIG. 12 secured to one side of a trash container in the open, unlocked condition.
Figure 14:
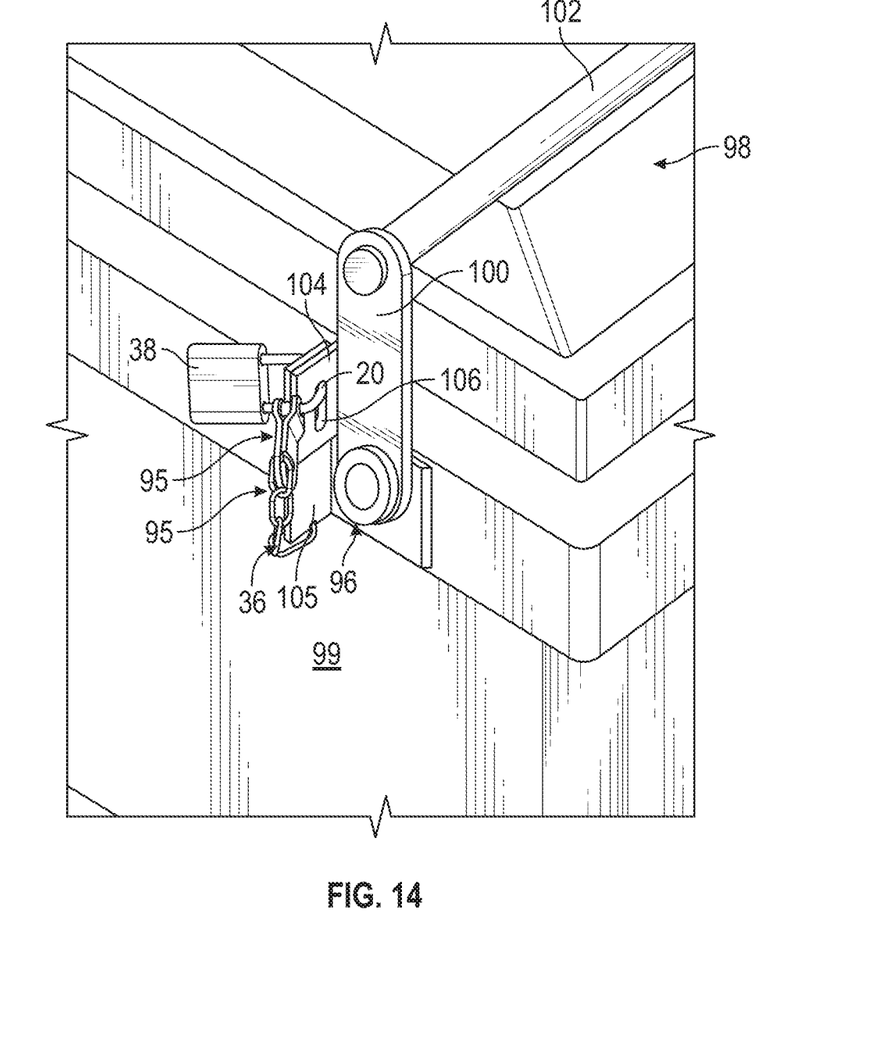
FIG. 14 illustrates the apparatus of FIG. 13 in the locked condition with the padlock of FIG. 11 securing the apparatus in a locked condition to hold a locking bar over the top of the lid of a trash container.

FIGS. 12 to 14 illustrate one embodiment of a possible application for the secure padlock and chain assembly 95. In FIG. 12, the free end of chain 36 of secure padlock and chain assembly 95 of FIG. 11 is secured to a lid locking device 96 for locking the lid 96 of a trash container 98 in a closed position, in place of the prior art secure padlock and chain assembly illustrated in FIG. 2. Lid locking device 96 is described in more detail in co-pending U.S. patent application Ser. No. 15/678,949 filed on Aug. 16, 2017, the contents of which are incorporated herein by reference. FIG. 12 illustrates the padlock shackle 20 in the open position. In operation, the base 97 of lid locking device is secured to the rim of the side wall 99 of trash container 98 adjacent the front of the container 98, as seen in FIG. 13. The free end of pivot arm 100 is secured to one end of a bar or rod 102 extending across the front of the container and secured to another, non-locking pivot arm pivotally mounted on the opposite side wall.

In order to lock the lid of the trash container in the closed position, the bar 102 is rotated upwards and rearwards over the top of the container, simultaneously pivoting the pivot arms about their pivot axis so that the locking flange 104 of locking pivot arm 100 is rotated towards stop plate 105 which projects from one end of base 97. FIG. 14 illustrates the locked condition, in which locking flange 104 is in face-to-face engagement with the stop plate 105, and the padlock shackle 20 is engaged through the aligned openings 106, 107 in locking flange 104 and stop plate 105, respectively, and locked to hold the bar 102 in the position shown in FIG. 14. This prevents access to the container by unauthorized individuals.

In one embodiment, a pair of plates for engagement over the larger shackle diameters had the following dimensions: Plate length: around 2.90 inches; Plate width: around 1.00 inches; Rivet hole diameter(s): around 0.20 inches; Shackle receiving hole diameter: Around 0.50 inches. In embodiments having a raised flange around the perimeter of the shackle hole 50, the height of the flange was around 0.19 inches. Pairs of plates for engagement over different shackle sizes had equivalent dimensions apart from the shackle hole diameters, which were around 0.44 and 0.38 inches, respectively. In some embodiments, the length of the notch may be around 1.2 to 1.3 inches and the angle of the notch to the adjacent side edge of the plate from which the notch extends is around 70 degrees.

One advantage of the padlock and chain connecting apparatus or assembly of the above embodiments is that it is easier to manufacture and assemble than the prior arrangements. It is also more compact and easier to handle. In some embodiments, elongated, uniform width plates 40 or 72 of the same sizes or two different widths may accommodate shackle openings 50 in a range of different diameters for close sliding engagement over the largest to the smallest shackle diameter. Plates may be made, for example, for engagement with $3/16$ inch to $1/2$ inch shackle diameters, e.g. shackle diameters of $3/16$, $1/4$, $9/32$, $5/16$, $3/8$, $7/16$ and $1/2$ inches, with the same width plate accommodating openings for fitting over two, three or more different shackle diameters. Rivet holes of different sizes may also be provided, with larger rivet holes and rivets in assemblies designed for attachment to the largest padlock sizes, for example rivet holes may be provided in diameters of $3/16$, $1/4$ and $5/16$ for receiving corresponding size rivets. One die set with different punch sizes to create the different diameter rivet holes 52 and shackle holes 50 may be used in manufacture of the plates. In some embodiments, sets of plates having holes 50 of three different diameters, for example around 0.50 inches, around 0.44 inches, and around 0.38 inches, may be provided.

The plates which form the connecting link or bracket apparatus 35, 70 of the above embodiments have a smaller footprint than the equivalent triangular plates of the prior art version of FIGS. 1 and 2, making the finished padlock and chain securing assembly more compact and easier to package, store, transport and display for sale purposes. There are also no projecting corners as in the assembly of FIG. 2 which are awkward and may catch on other items in the vicinity. Instead, the plates have straight opposite sides and rounded opposite ends.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A padlock and chain connecting apparatus comprising:
a pair of identical elongate plates of uniform width along their length having first and second ends and opposite first and second sides, each plate having a first portion extending from the first end towards the second end, a second portion extending from the second end towards the first end, and a step portion between the first and second portions which offsets the first portion from the second portion;
the first portion having a first opening for engagement over a padlock shackle and the second portion having at least one second opening for receiving a fastener;
the second portion of each plate having a notch extending inwardly from the first side and inclined away from the step portion and first end towards the second end; whereby when the second portions of the plates are placed in face to face engagement with the first portions spaced apart and in alignment, the notches overlap to define a securing orifice for trapping a link of a chain, the first openings are aligned, and the second openings are aligned; and
a permanent mechanical fastener configured to extend through the aligned second openings to secure the plates together when a link of a chain is engaged in the securing orifice and the first openings are engaged over a straight portion of a padlock shackle, wherein the pair of identical elongate plates include a plurality of pairs of the elongate plates for engagement with different size padlock shackles, each pair of the plates comprising plates all of identical shape and dimensions and having first openings of a predetermined diameter different from the diameters of the first openings in the other pairs of plates.

2. The apparatus of claim 1, wherein the permanent mechanical fastener comprises a rivet.

3. The apparatus of claim 1, wherein the step portion is located closer to the first end than the second end.

4. The apparatus of claim 1, wherein at least some of the pairs of plates have second openings of diameter equal to the diameter of the second opening in the other pairs of plates.

5. The apparatus of claim 1, wherein there are at least two pairs of elongate plates, and the diameters of the first openings in the respective pairs of plates are of sizes which are selected to be a close sliding fit over respective padlock shackles of different diameters.

6. The apparatus of claim 5, wherein the diameters of the first openings in the respective pairs of plates are selected for a close sliding fit over padlock shackles of 3/8 inches, 7/16 inches, and 1/2 inch, respectively.

7. The apparatus of claim 5, wherein there are at least five pairs of elongate plates and the diameters of the first openings in the respective pairs of plates are selected for a close sliding fit over padlock shackles of 1/4 inch, 3/16 inches, 9/32 inches, 5/16 inches, 3/8 inches, 7/16 inches, and 1/2 inch, respectively.

8. The apparatus of claim 1, wherein the first and second ends of the plates are of arcuate shape.

9. The apparatus of claim 1, further comprising a spacer ring configured to engage between the first portions of the plates when the first opening of a first one of the plates, the spacer ring, and the first opening of a second one of the plates are engaged over the padlock shackle.

10. The apparatus of claim 1, wherein each plate has an outer face and an inner face, and the plates are secured together with the inner faces of the second portions of the plates in face to face engagement and the first portions spaced apart, and each first opening has a peripheral rim having a raised flange projecting from the inner face and configured for engagement with the opposing raised flange on the peripheral rim of the first opening on the inner face of the opposing plate, and the raised flanges are adapted to be in contact and to surround part of a padlock shackle when the plates are secured together and the first opening of each plate is engaged in turn over the padlock shackle and moved to the closed end portion of the shackle.

11. The apparatus of claim 1, wherein each pair of the plates have the notches of a predetermined width different from the width of notches in the other pair of plates in order to accommodate different chain link diameters.

12. A permanent padlock and chain assembly, comprising:
a padlock having a generally U-shaped shackle;
a chain having a plurality of links;
first and second plates of at least substantially rigid material and identical shape and dimensions, each plate being elongate and of uniform width along the length of the plate, and having first and second ends and opposite first and second sides, each plate having a first portion extending from the first end towards the second end, a second portion extending from the second end toward the first end, a step portion between the first and second portions which offsets the first portion from the second portion, the first portion having a first opening configured for close sliding engagement over the padlock shackle and the second portion having a second opening for receiving a fastener, the second portion of each plate having a notch extending inwardly from the first side and inclined away from the step portion and first end towards the second end;
the first and second plates each having an outer face and an inner face, each plate being positioned with the inner face facing the inner face of the other plate and the second portions in face to face engagement with the second openings aligned and the first portions spaced apart and the first openings in alignment and engaged over a straight portion of the padlock shackle with a curved portion of the U-shaped shackle located between the plates and an openable end of the shackle;
the notches in the overlapping second portions of the plates overlapping to form a closed orifice engaged over one link of the chain to lock the chain to the plates; and
a permanent mechanical fastener engaged through the aligned second openings of the plates to secure the plates together with the first portions spaced apart;
whereby the first portions of the plates are secured on the shackle at a predetermined spacing and the first openings cannot move over the curved portion of the shackle when the plates are secured together,
wherein the first and second plates include a plurality of pairs of the first and second plates for engagement with different size padlock shackles, each pair of the plates comprising plates all of identical shape and dimensions and having first openings of a predetermined diameter different from the diameters of the first openings in the other pairs of plates.

13. The assembly of claim 12, wherein each pair of the plates have the notches of a predetermined width different from the width of notches in the other pair of plates in order to accommodate different chain link diameters.

\* \* \* \* \*